US006592160B1

(12) United States Patent
Nicolay et al.

(10) Patent No.: US 6,592,160 B1
(45) Date of Patent: Jul. 15, 2003

(54) TOOL HANDLE

(75) Inventors: Kenneth M. Nicolay, Fairway, KS (US); Jonathon K. Kemnitzer, Kansas City, MO (US); Mrako A. Fenster, Basehor, KS (US); Dale R. Jamieson, Shawnee, KS (US); Jonathan C. Ochenas, Kansas City, MO (US); Lewis A. Mendelson, Overland Park, KS (US); Yutaka Kazamaki, Lenexa, KS (US)

(73) Assignee: Nicolay Family Enterprises, L.L.C., Fairway, KS (US)

( * ) Notice: Subject to any disclaimer, the term of this patent is extended or adjusted under 35 U.S.C. 154(b) by 0 days.

(21) Appl. No.: 10/034,671

(22) Filed: Dec. 26, 2001

(51) Int. Cl.[7] .............................. A01B 1/22; B25G 1/06
(52) U.S. Cl. ........................... 294/57; 294/58; 294/54.5
(58) Field of Search ........................... 294/49, 54.5, 57, 294/58; 37/265, 285; 16/408, 426, 430

(56) References Cited

U.S. PATENT DOCUMENTS

| | | | | | |
|---|---|---|---|---|---|
| 171,325 | A | | 12/1875 | Smith et al. | |
| 271,303 | A | | 1/1883 | Blaker | |
| 666,633 | A | | 1/1901 | Farmer | |
| D39,441 | S | | 8/1908 | Bain | |
| 930,660 | A | * | 8/1909 | Gifford | 294/54.5 |
| 1,032,535 | A | | 7/1912 | Ettinghaus | |
| 1,207,472 | A | | 12/1916 | Barton | |
| 1,486,758 | A | | 3/1924 | Jerram | |
| 1,519,892 | A | | 12/1924 | Webster | |
| 1,901,778 | A | * | 3/1933 | Schlag | 172/372 |
| D123,113 | S | | 10/1940 | Loud et al. | |
| D153,070 | S | | 3/1949 | Lund | |
| 2,545,585 | A | | 3/1951 | Montague | |
| 2,629,624 | A | | 2/1953 | Nelles | |
| 2,852,872 | A | | 9/1958 | Benz | |
| 2,933,836 | A | | 4/1960 | McKinley | |
| 3,023,021 | A | | 2/1962 | Fricke et al. | |
| 3,136,574 | A | | 6/1964 | Pasquale | |
| 3,223,383 | A | | 12/1965 | Hrabal | |
| 3,981,043 | A | | 9/1976 | Curry | |
| 4,125,951 | A | | 11/1978 | Huerth | |
| 4,354,702 | A | * | 10/1982 | Clements et al. | 294/9 |
| 4,669,206 | A | | 6/1987 | Yost | |
| D305,603 | S | | 1/1990 | Nelson et al. | |
| D333,074 | S | | 2/1993 | Ciccarelli | |
| 5,197,772 | A | | 3/1993 | Stecyk | |
| 5,395,147 | A | | 3/1995 | Brown et al. | |
| 5,499,852 | A | | 3/1996 | Seigendall | |
| D380,360 | S | | 7/1997 | Scruggs | |
| 5,669,163 | A | | 9/1997 | Winter | |
| 5,782,518 | A | | 7/1998 | Scruggs | |
| 5,887,920 | A | | 3/1999 | Perciful | |
| 5,921,600 | A | | 7/1999 | Lucas | |
| 5,974,775 | A | | 11/1999 | Niehuss | |
| 6,062,619 | A | | 5/2000 | Clark, Jr. | |

* cited by examiner

*Primary Examiner*—Dean J. Kramer
(74) *Attorney, Agent, or Firm*—Shughart, Thomson & Kilroy, P.C.

(57) ABSTRACT

A handle is disclosed for tools such as shovels and the like. The handle includes first and second legs, each of which has a first end which is securable to a tool head such that the first and second legs extend outwardly from the tool head in generally parallel relation to one another. A handlebar is connected to second ends of the first and second legs. The handlebar is curved to accommodate a normal orientation of a user's wrists. A lower handle is slidably connected to the first and second legs so as to be moveable toward and away from the handlebar and pivotable between a retracted position and an operating position. In the operating position the lower handle extends outward from a plane defined by the first and second legs. A slide lock is provided for selectively securing the lower handle to the first and second legs.

22 Claims, 3 Drawing Sheets

TOOL HANDLE

BACKGROUND OF THE INVENTION

1. Field of the Invention

This invention relates to an improved handle for use on tools such as shovels and the like.

2. Description of the Related Art

Tools such as shovels (including snow shovels, spades, and scoops), forks and the like typically have handles comprising a single straight shaft which is secured to a head of the tool along a central axis of the tool head. One problem with such tool handles arises when the user must lift the tool head off of the ground in order to dump or expel a load therefrom. To lift the tool, the user must bend over at the waist, grasp the handle near the tool head, and lift the tool using his back. Lifting with the back in this manner often causes strain or injury to the user's back. Previous attempts to address this problem include U.S. Pat. Nos. 5,499,852, 5,921,600 and 6,062,619, which describe auxiliary handles for attachment to a single shaft tool handle, the auxiliary handles being intended to extend upwardly from the primary tool handle shaft so that the user does not have to bend over as far in order to lift the tool head. In addition, U.S. Pat. No. 171,325 discloses a drag rake handle having a pair of limbs mounted at an acute angle to one another and having an auxiliary handle mounted between the limbs. The auxiliary handle may be mounted so as to extend upwardly from the limbs.

None of these previous attempts to provide tool handles which facilitate lifting appear to have gained widespread use, and therefore there remains a need for an ergonomically designed tool handle which is relatively easy to use and which facilitates lifting.

SUMMARY OF THE INVENTION

The present invention comprises a handle for tools such as shovels and the like. The handle includes first and second legs, each of which has a first end which is securable to a tool head such that the first and second legs extend outwardly from the tool head in generally parallel relation to one another. A handlebar is connected to second ends of the first and second legs. The handlebar is outwardly curved to accommodate a normal orientation of a user's wrists. A lower handle is slidably connected to said first and second legs so as to be moveable toward and away from the handlebar and pivotable between a retracted position and an operating position. In the operating position the lower handle extends outward from a plane defined by the first and second legs. A slide lock is provided for selectively securing the lower handle to the first and second legs.

DETAILED DESCRIPTION OF THE PREFERRED EMBODIMENT

Figure 1:
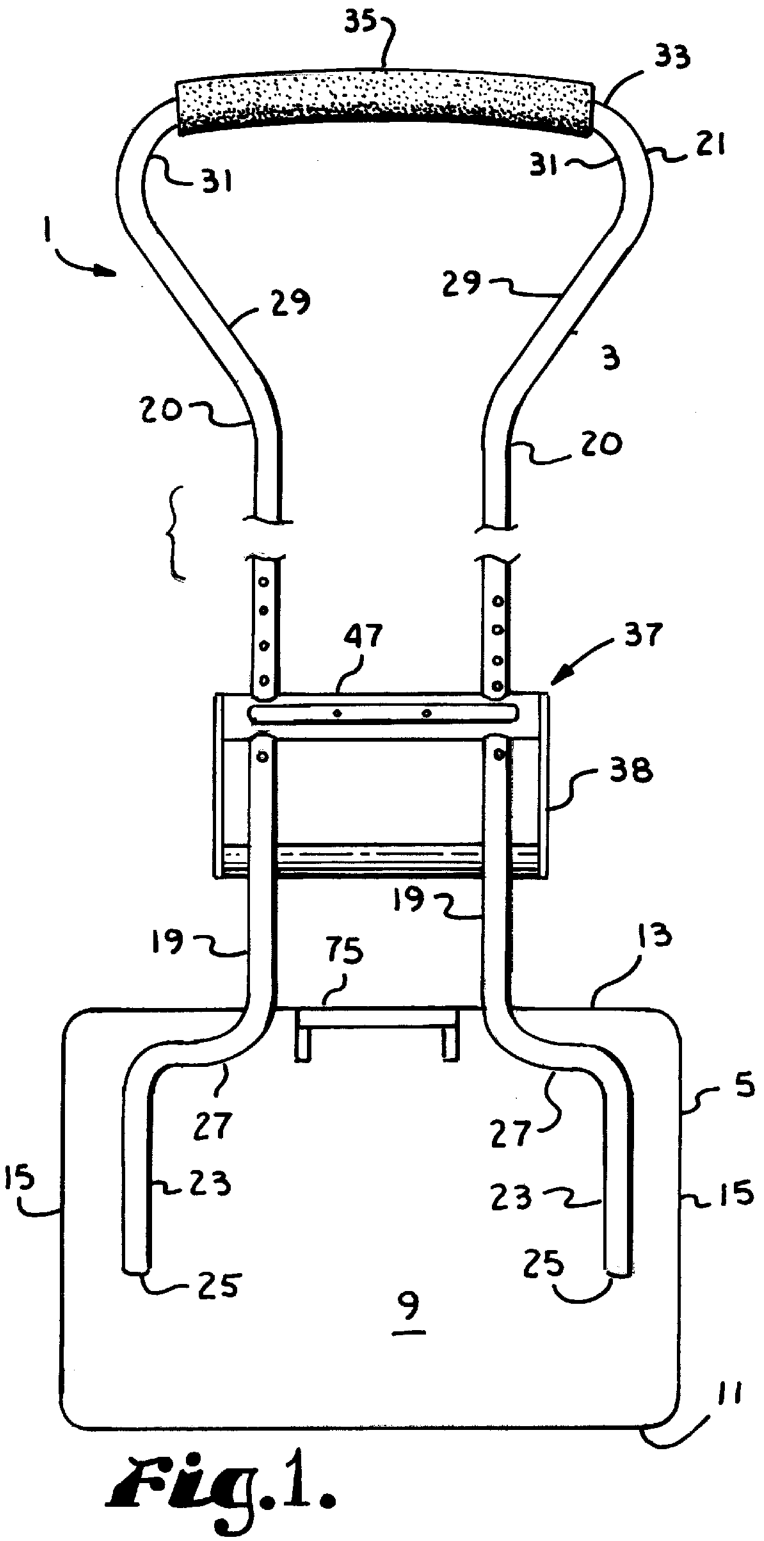
FIG. 1 is a rear view of a snow shovel which includes a tool handle embodying the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference number 1 generally designates a tool handle embodying the present invention. The handle 1 is shown in FIGS. 1–4 and 6 as being part of a snow shovel 3 having a conventional snow shovel blade 5. The blade 5 includes a front surface 7, a rear surface 9, a lower or scraping edge 11, an upper edge 13, and opposed side edges 15. While being generally broad and flat in shape, the blade 5 preferably curves upwardly slightly from the lower edge 11 to the upper edge 13. It is to be understood, however, that the handle 1 is easily adaptable for use on various types of shovels other than snow shovels, as well as on other types of tools such as forks, rakes, brooms and the like having tool heads other than shovel blades.

Figure 2:
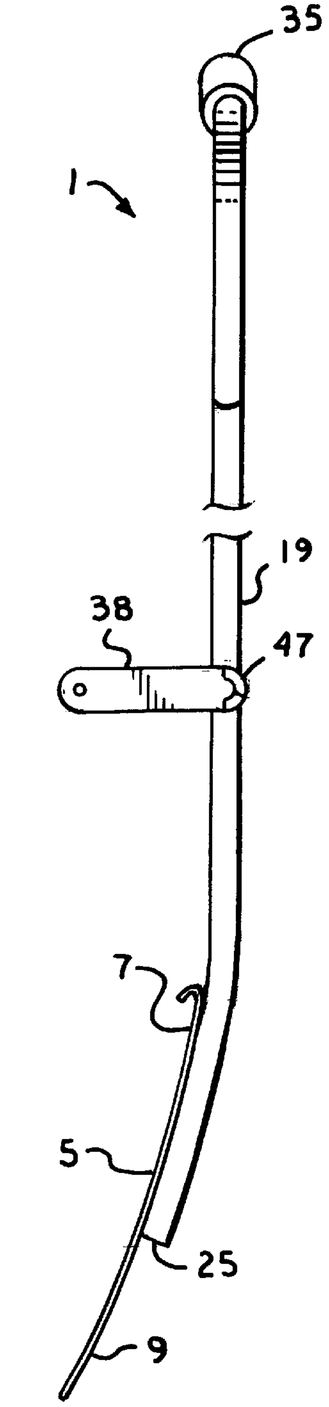
FIG. 2 is a side view of the shovel of FIG. 1.

Referring to FIGS. 1 and 2, the handle 1 generally comprises a length of tubular material such as steel or aluminum tubing bent to form a pair of parallel legs 19 connected at respective first ends 20 by a gripping portion 21. Each of the legs 19 has a tool head attachment portion 23 at a second end 25 thereof opposite the first end 20. The attachment portions 23 are fixedly connectable to the blade 5 by conventional means (such as screws, bolts, rivets, spot welding, etc.) such that the legs 19 extend upwardly or outwardly past the upper edge 13 of the blade 5 in parallel spaced relation to one another. The attachment portions 23 are preferably connected to the rear surface 9 of the blade 5 proximate its side edges 15. Depending upon the width of the blade 5, the legs 19 may include an inwardly offset section 27 such that the legs 19 are spaced closer together than the attachment portions 23. Handles 1 used on shovels or spades having narrow blades used for digging would most likely not require an offset section 27. For reasons which will be discussed later, the legs 19 should not be spaced any closer to one another than will allow a user to easily insert a foot therebetween.

Figure 3:
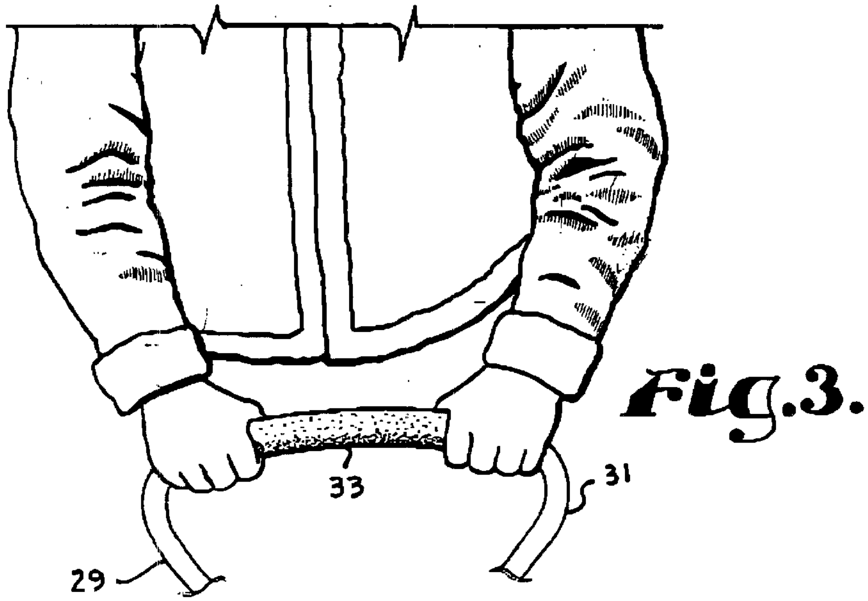
FIG. 3 is a fragmentary upper front view of a person using the shovel of FIG. 1 showing how the curve of the handlebar thereof conforms to the normal orientation of the user's wrists.

The gripping portion 21 of the handle 1 includes a pair of slanted portions 29 each of which slants outwardly from the first end 20 of the respective leg 19. From the outwardly slanted portions 29, the gripping portion 21 of the handle 1 curves inwardly through curved portions 31. The two curved portions 31 are connected to one another by a handlebar 33 sized and shaped for gripping by the user of the shovel 3 with either one or both hands. The handlebar 33 is bowed outwardly so as to accommodate the normal orientation of a user's wrists when the handlebar 33 is being grasped in both hands and held relatively close to the user's body as shown in FIG. 3. This ergonomic design makes the handle 1 comfortable for the user to grasp. Additional comfort is provided by a layer of foam material 35 applied to the handlebar 33 which acts as a cushion for the user's hands.

Figure 4:
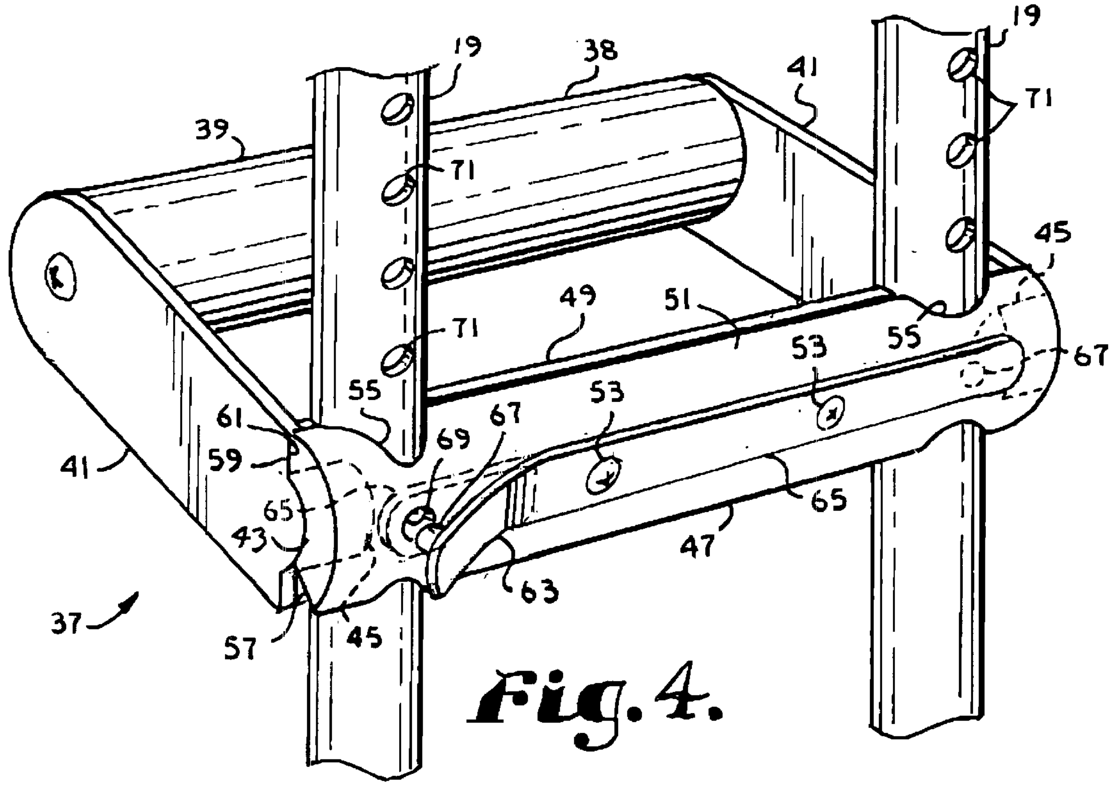
FIG. 4 is an enlarged fragmentary perspective view of the handle of FIG. 1 showing the lower handle assembly thereof.

A lower or lifting handle assembly 37, which is slidably and pivotally mounted to the legs 19, also forms a part of the handle 1. As best seen in FIG. 4, the lower handle assembly 37 includes a lower handle 38 which is generally in the form of a bail having a generally cylindrical hand grip 39 with sidepieces 41 extending radially outward from each end thereof. Each sidepiece 41 has a distal end 43 opposite the hand grip 39 and a stub axle 45 which extends inwardly from the respective sidepiece 41 proximate its distal end 43 in a direction generally parallel to the hand grip 39.

The lower handle assembly 37 further includes a split tubular crosspiece 47 having a front section 49 and a rear section 51. The rear section 51 is connectable to the front section 49 by fasteners such as screws 53. Each of the sections 49 and 51 has a pair of semicircular notches 55 formed therein sized and spaced apart to slidably capture the legs 19 when the sections 49 and 51 are connected. The ends of the crosspiece 47 pivotally receive the stub axles 45 on the handle sidepieces 41.

The lower handle 38 is pivotable between an operating position (as shown in FIG. 2) wherein the hand grip 39 is spaced above the plane of the legs 19 and a storage position (as shown in FIG. 1) wherein the hand grip 39 is folded downwardly against the legs 19. In the operating position the sidepieces 41 are generally perpendicular to the legs 19. Limit stops 57 are provided in order to prevent the lower handle 38 from pivoting upwardly past the operating position. The stops 57 comprise longitudinal extensions of the rear crosspiece section 51 having radial abutment surfaces 59. The abutment surfaces 59 engage corresponding radial abutment surfaces 61 on the sidepieces 41 formed by cutting away a semi-annular portion of the distal end 43 of each sidepiece 41 from the stub axle 45 outward.

The ability of the lower handle 38 to fold into the storage position is advantageous in facilitating storage, display and transportation of the shovel 3. Under these circumstances, a plurality of shovels 3 often must be stacked together in a small area. The area required is greatly reduced by folding the lower handles 38 into the storage position so that the shovels 3 can be packed more closely to one another than would be possible if the lower handles 38 were fixed in the operating position. To this end, it is foreseen that the lower handle 38 could be mounted between the legs 19 of the handle 1 so as to fold into a storage position wherein the lower handle 38 was generally coplanar with the legs 19.

The position of the lower handle assembly 37 relative to the handlebar 33 is adjustable to accommodate users of various sizes by sliding the crosspiece 47 up or down the legs 19. The crosspiece 47 may be locked in position at increments along the legs 19 by a slide lock 63. The slide lock 63 comprises a flat spring 65 which is connected to the rear section 51 of the crosspiece 47 by the screws 53. A pair of detents 67 are connected to the inner surface of the spring 65 in alignment with holes 69 formed in the rear section 51 of the crosspiece 47. A plurality of longitudinally spaced holes 71 are formed in each leg 19 so as to be selectively alignable with the detents 67. To relocate the lower handle asembly 37, the user simply pulls outwardly on the ends of the flat spring 65 so as to disengage the detents 67 from a pair of the holes 71. The crosspiece 47 can then be slid along the legs 19 to the desired position. The ends of the spring 65 are then released and the detents 67 allowed to extend through the holes 69 in the crosspiece 47 and into the aligned holes 71 in the legs 19.

Figure 6:
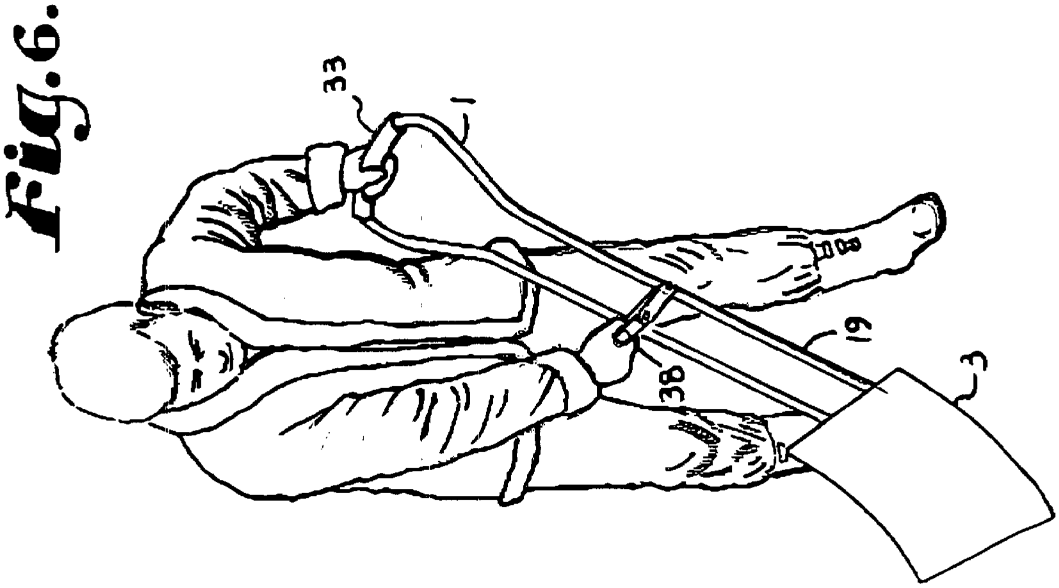
FIG. 6 is a perspective view of a person using the shovel of FIG. 1.
Figure 5:
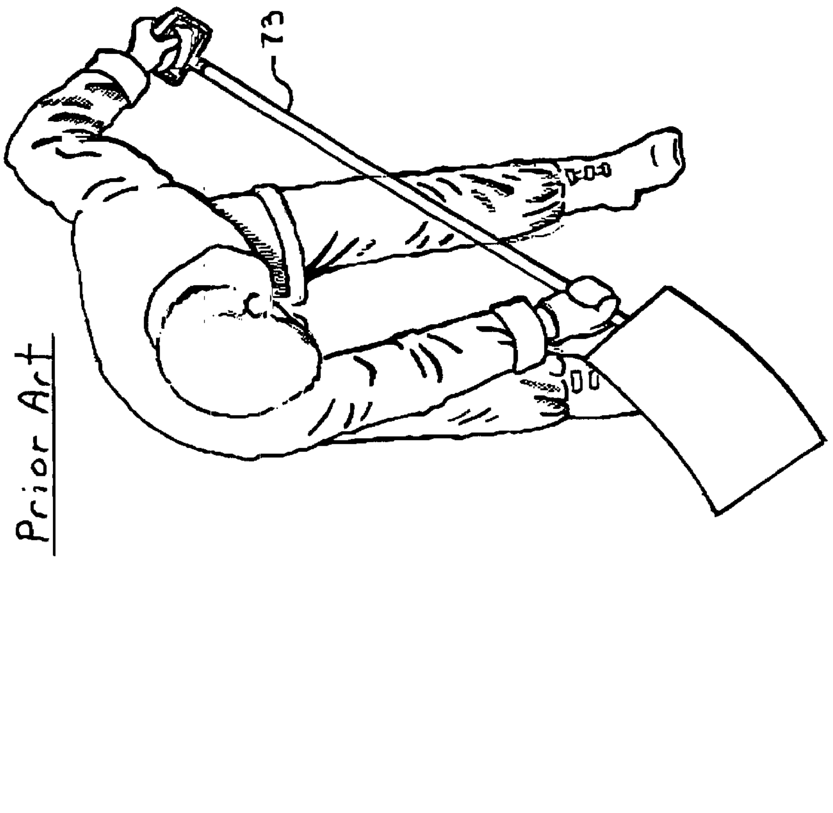
Fig.5. Prior Art
FIG. 5 is a perspective view of a person using a snow shovel with a prior art handle.

In use, the lower handle assembly 37 serves to make the shovel 3 much easier to lift than is the case with a conventional snow shovel. As shown in FIG. 5, the user of a conventional shovel 73 must bend substantially at the waist in order to reach down and grip the handle of the shovel 73 near the blade so that he can lift a quantity of snow and throw it out of the way. Because the user must reach down so far to grab the handle, it is difficult for the user to bend at the knees to facilitate lifting with his legs. The user is, therefore, forced to lift with his back, which will often result in back strain. With the shovel of the present invention, however, the user can grasp the lower handle 38 as shown in FIG. 6 without bending over nearly as far at the waist. He is then able to bend at the knees to get in position to lift with his legs, sparing unnecessary injury or strain to his back.

The dual legs 19 of the handle 1 also act to make the shovel 3 easier to use than a conventional snow shovel. When a user lifts a conventional shovel with a load of snow supported on the blade, the weight of the load is often unbalanced and tends to create a torsional force on the handle. If the user does not grip the handle sufficiently tightly, this torsional force will cause the shovel to rotate or roll about its handle, thereby spilling the load of snow. Constantly gripping the handle tightly enough to offset this torsional force adds to the user's fatigue. The dual legs 19 of the present invention move the supports for the blade 5 and the load supported thereon outwardly, thereby providing a lever arm which helps to counter the rotational forces.

The wide handlebar 33 and dual legs 19 also make the shovel 3 easier to use when pushing or "plowing" snow, as opposed to lifting and throwing it. When plowing with a conventional snow shovel, such as the shovel 73, the user can only effectively push with one hand because the end of the shovel handle does not provide room for the placement of both hands. Because of the central attachment of the handle to the blade of the shovel, the direction of movement of the shovel is also difficult to control. When the blade hits any irregularity in the surface being plowed, the blade will tend to yaw or veer to one side. The width of the handlebar 33 of the present invention allows the user to push the shovel with both hands while plowing. The pushing force is then distributed between the legs 19 and transmitted to the blade 5 proximate the side edges 15, thereby reducing the tendency of the blade 5 to yaw.

When using a snow shovel to break loose packed snow or ice, a user often must kick or push against the rear edge of the blade with one foot to apply additional force to the scraping edge. With a conventional snow shovel, this force must be applied to the rear edge of the blade outboard of the handle instead of along the centerline of the blade. This offset force causes the blade to yaw, making the ice breaking action less effective. The dual leg design of the handle 1 allows the user to insert his foot between the legs 19 and apply force to the rear edge 13 directly along the centerline of the blade 5, eliminating the tendency of the blade to yaw. If so desired, the blade 5 may be provided with a step or kick plate 75 between the legs 19 and preferably on the rear surface 9, proximate the rear edge 13 for the user to push against with his foot.

It is to be understood that while certain forms of the present invention have been illustrated and described herein, it is not to be limited to the specific forms or arrangement of parts described and shown. For example, while the handle 1 has been described as being formed of a single length of tubing bent to form the proper shape, the handle 1 could also be formed by the joining together of sections which may be of similar or different materials. The handlebar 33 could, for instance, comprise a separate molded plastic part which could be connected to the legs 19 by bolts, rivets, or similar fasteners. Such a molded plastic handlebar 33 might include two outer hand grips and a central grip surface. The outer hand grips would be used when holding onto the handlebar 33 with two hands and the central grip surface would be used when holding onto the handlebar 33 with one hand and the lower handle 37 with the other.

The present invention is also not intended to be limited to a handle 1 wherein the legs 19 are offset inwardly from the ends of the handlebar 33 (such as through the slanted portions 29 and curved portions 31). While this inward offset has an advantage in that it allows the user to stand closer to the centerline of the shovel while shoveling with one hand on the handlebar 33 and the other hand on the lower handle 38 than would be possible with a handle 1 having no inward offset, the handle 1 would still provide benefits in use without the inward offset.

It is also to be understood that the particular design of the slide lock 63 described herein is not intended to be limiting, as many alternative types of locking devices could be used to selectively retain the lower handle assembly in position on the legs 19. For example, a thumbscrew or similar threaded member could be used to draw the front section 49 and rear section 51 of the crosspiece 47 together so as to clamp the legs 19 therebetween. This would provide for infinitely variable positioning of the lower handle assembly 37 instead of the incrementally variable positioning of the preferred embodiment described above. The slide lock 63 could also comprise a single detent 67 cooperating with receiving holes 71 which are formed in only one of the legs 19.

In addition, it is to be understood that although the tool handle 1 is particularly well adapted for use with shovels and other tools whose use involves lifting, the tool handle 1 could also be adapted for use with a variety of tools including tools adapted to be pulled toward and pushed away from the user including tools such as brooms, rakes, or hoes.

What is claimed and desired to be secured by Letters Patent is as follows:

1. A tool handle adapted to be secured to a tool head, said tool handle comprising:

a) first and second legs, each of said legs having a first end and a second end, said first ends being securable to the tool head such that said first and second legs extend outwardly from the tool head in generally parallel relation to one another, said legs defining a primary plane in which the preponderance of said legs lie;

b) a handlebar connected to said second ends of said first and second legs; and c) a lower handle connected to said first and second legs, said lower handle being pivotable between a retracted position and an operating position, in said operating position said lower handle extending outwardly from said primary plane.

2. The tool handle as in claim 1 wherein said handlebar is continuously curved in an outward direction to accommodate a normal orientation of a user's wrists when said handlebar is being grasped in both of the user's hands and held relatively close to the user's body.

3. The tool handle as in claim 1 in combination with the tool head.

4. The tool handle in combination with the tool head as in claim 3 wherein said tool head comprises a shovel blade.

5. A tool handle adapted to be secured to a tool head, said tool handle comprising:

a) first and second legs, each of said legs having a first end and a second end, said first ends being securable to the tool head such that said first and second legs extend outwardly from the tool head in generally parallel relation to one another;

b) a handlebar connected to said second ends of said first and second legs; and c) a lower handle slidably connected to said first and second legs so as to be moveable toward and away from said handlebar, said lower handle further being pivotable between a retracted position and an operating position, in said operating position said lower handle extending outwardly from a plane defined by said first and second legs.

6. The tool handle as in claim 5 and further including a slide lock for locking said lower handle into a selected position along said first and second legs.

7. The tool handle as in claim 6 wherein:

a) said lower handle comprises a generally cylindrical hand grip having opposed hand grip ends and a pair of sidepieces, each of said sidepieces extending radially outward from one of said hand grip ends, each said sidepiece having a distal end opposite said hand grip; and b) each of said sidepieces is pivotally connected to a split crosspiece having a front section and a rear section, each of said front and rear sections having a pair of semicircular notches formed therein, said notches slidably capturing said handle first and second legs.

8. The tool handle as in claim 7, wherein:

a) said first leg includes a plurality of longitudinally spaced openings; and b) said slide lock comprises a first detent secured to said split crosspiece; said first detent being engageable with a selected one of said longitudinally spaced openings in said first leg.

9. A tool handle adapted to be secured to a tool head, said tool handle comprising:

a) first and second legs, each of said legs having a first end and a second end, said first ends being securable to the tool head such that said first and second legs extend outwardly from the tool head in generally parallel relation to one another;

b) first and second angled sections angling outwardly from said second ends of said first and second legs, respectively;

c) first and second curved sections curving inwardly from said first and second angled sections, respectively;

d) a handlebar connected between said curved sections; and e) a lower handle connected to said first and second legs, said lower handle being pivotable between a retracted position and an operating position, in said operating position said lower handle extending outwardly from a plane defined by said first and second legs.

10. The tool handle as in claim 9 wherein said handlebar is outwardly bowed.

11. A tool including a tool handle and a tool head, wherein said tool handle comprises:

a) first and second legs, each of said legs having a first end and a second end, said first ends being securable to said tool head such that said first and second legs extend outwardly from said tool head in generally parallel relation to one another;

b) a handlebar connected to said second ends of said first and second legs;

c) a lower handle slidably connected to said first and second legs so as to be moveable toward and away from said handlebar;

d) a slide lock for locking said lower handle into a selected position along said first and second legs; and e) wherein said lower handle is pivotable between a retracted position and an operating position, in said operating position said lower handle extending outward from a plane defined by said first and second legs.

12. The tool as in claim 11 wherein said tool head comprises a shovel blade.

13. A tool including a tool handle and a tool head, wherein said tool handle comprises:

a) first and second legs, each of said legs having a first end and a second end, said first ends being securable to said tool head such that said first and second legs extend outwardly from said tool head in generally parallel relation to one another;

b) a handlebar connected to said second ends of said first and second legs;

c) a lower handle slidably connected to said first and second legs so as to be moveable toward and away from said handlebar;

d) said lower handle comprises a generally cylindrical hand grip having opposed hand grip ends and a pair of sidepieces, each of said sidepieces extending radially outward from one of said band grip ends, each said sidepiece having a distal end opposite said hand grip; and e) each of said sidepieces is pivotally connected to a split crosspiece having a front section and a rear section, each of said front and rear sections having a pair of semicircular notches formed therein, said notches slidably capturing said handle first and second legs.

14. The tool as in claim 13 and further including a slide lock for locking said lower handle into a selected position along said first and second legs.

15. The tool as in claim 14, wherein:

a) said first leg includes a plurality of longitudinally spaced openings; and b) said slide lock comprises a first detent secured to said split crosspiece; said first detent being engageable with a selected one of said longitudinally spaced openings in said first leg.

16. A tool handle comprising:

a) first and second legs, each of said legs having a first end and a second end, said first ends being securable to a tool head such that said first and second legs extend outwardly from the tool head in generally parallel relation to one another;

b) first and second angled sections angling outwardly from said second ends of said first and second legs, respectively;

c) first and second curved sections curving inwardly from said first and second angled sections, respectively;

d) a handlebar connected between said curved sections; and e) a lower handle slidably connected to said first and second legs so as to be moveable toward and away from said handlebar and pivotable between a retracted position and an operating position, in said operating position said lower handle extending outward from a plane defined by said first and second legs.

17. The tool handle as in claim 16 wherein said handlebar is outwardly bowed.

18. The tool handle as in claim 16 wherein:

a) said lower handle comprises a generally cylindrical hand grip having opposed hand grip ends and a pair of sidepieces, each of said sidepieces extending radially outward from one of said hand grip ends, each said sidepiece having a distal end opposite said hand grip; and b) each of said sidepieces is pivotally connected to a split crosspiece having a front section and a rear section, each of said front and rear sections having a pair of semicircular notches formed therein, said notches slidably capturing said handle first and second legs.

19. The tool handle as in claim 18 and further including a slide lock for locking said lower handle into a selected position along said first and second legs.

20. The tool handle as in claim 19, wherein:

a) said first leg includes a plurality of longitudinally spaced openings; and b) said slide lock comprises a first detent secured to said split crosspiece; said first detent being engageable with a selected one of said longitudinally spaced openings in said first leg.

21. The tool handle as in claim 16 combination with the tool head.

22. The tool handle in combination with the tool head as in claim 21 wherein said tool head comprises a shovel blade.

* * * * *